(12) United States Patent
Inoue

(10) Patent No.: US 8,182,101 B2
(45) Date of Patent: May 22, 2012

(54) ILLUMINATION OPTICAL SYSTEM HAVING THE LONGEST AIR INTERSPACE DISTANCE BETWEEN A FIRST AND A SECOND OPTICAL UNIT WHERE A SPECIFIC CONDITION IS SATISFIED FOR THE OPTICAL SYSTEM

(75) Inventor: Chiaki Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/515,885

(22) PCT Filed: Feb. 4, 2009

(86) PCT No.: PCT/JP2009/000421
§ 371 (c)(1),
(2), (4) Date: May 21, 2009

(87) PCT Pub. No.: WO2009/101771
PCT Pub. Date: Aug. 20, 2009

(65) Prior Publication Data
US 2011/0063578 A1 Mar. 17, 2011

(30) Foreign Application Priority Data
Feb. 15, 2008 (JP) .................. 2008-034266

(51) Int. Cl.
*G03B 21/20* (2006.01)
*G02B 9/00* (2006.01)
(52) U.S. Cl. ...................... 353/102; 359/754
(58) Field of Classification Search .............. 353/34, 353/20, 31, 32, 38, 82, 102; 359/683, 619, 359/621, 639, 640, 676, 754, 237, 238, 432–435; 362/317, 19, 332; 250/216, 201.2
See application file for complete search history.

(56) References Cited

U.S. PATENT DOCUMENTS

| | | | |
|---|---|---|---|
| 5,098,184 A | 3/1992 | van den Brandt et al. | 353/102 |
| 5,886,835 A * | 3/1999 | Suzuki et al. | 359/782 |
| 6,461,001 B2 * | 10/2002 | Okamori et al. | 353/102 |
| 6,565,211 B1 * | 5/2003 | Sekine et al. | 353/20 |

(Continued)

FOREIGN PATENT DOCUMENTS
JP 3-111806 5/1991
(Continued)

OTHER PUBLICATIONS
International Search Report and Written Opinion in PCT/JP2009/000421.

*Primary Examiner* — Que T Le
*Assistant Examiner* — Jennifer Bennett
(74) *Attorney, Agent, or Firm* — Fitzpatrick, Cella, Harper & Scinto

(57) ABSTRACT

The illumination optical system includes an integrator configured to divide light from a light source into plural light fluxes, and a collection optical system configured to collect the plural light fluxes from the integrator toward an illumination surface. A rear principal point of the collection optical system is located closer to the light source than a front principal point of the collection optical system. The configuration provides a compact illumination optical system which brightly illuminates the illumination surface with the light and enables high contrast image projection.

17 Claims, 2 Drawing Sheets

U.S. PATENT DOCUMENTS

| | | |
|---|---|---|
| 6,626,540 B2 | 9/2003 | Ouchi et al. ............ 353/31 |
| 6,646,806 B1 * | 11/2003 | Bierhuizen .............. 359/618 |
| 6,705,730 B2 * | 3/2004 | Ohshima et al. .......... 353/7 |
| 6,926,411 B2 | 8/2005 | Ouchi et al. ............ 353/20 |
| 7,044,607 B2 | 5/2006 | Ouchi et al. ............ 353/31 |
| 7,400,455 B2 * | 7/2008 | Sawamoto ............... 359/691 |
| 2002/0005994 A1 * | 1/2002 | Shikama ................. 359/749 |
| 2002/0015235 A1 * | 2/2002 | Hirose .................. 359/684 |
| 2003/0067586 A1 * | 4/2003 | Chigira et al. .......... 353/20 |
| 2006/0146419 A1 * | 7/2006 | Hirose .................. 359/684 |
| 2006/0187416 A1 | 8/2006 | Ouchi et al. ............ 353/31 |

FOREIGN PATENT DOCUMENTS

| | | |
|---|---|---|
| JP | 2001-154268 | 6/2001 |
| JP | 2001-337393 | 12/2001 |
| JP | 2004-45907 | 2/2004 |
| JP | 3770054 B2 | 4/2006 |
| JP | 3858548 B2 | 12/2006 |
| JP | 2007-57810 | 3/2007 |

* cited by examiner

[Fig. 1]
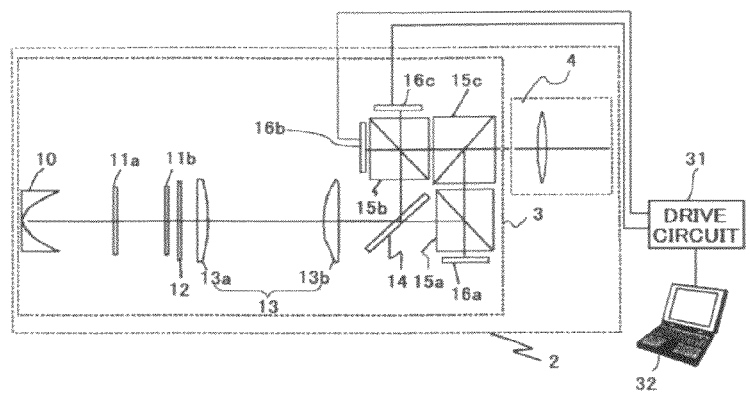
[Fig. 2]
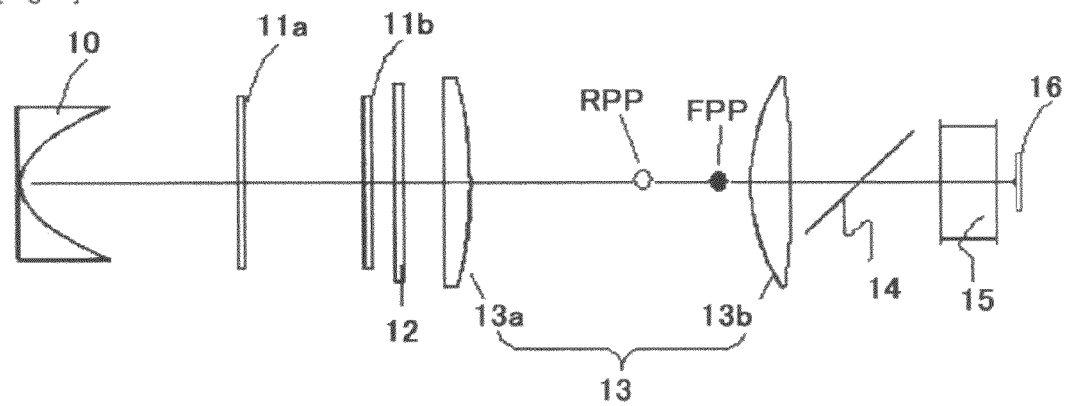
[Fig. 3]
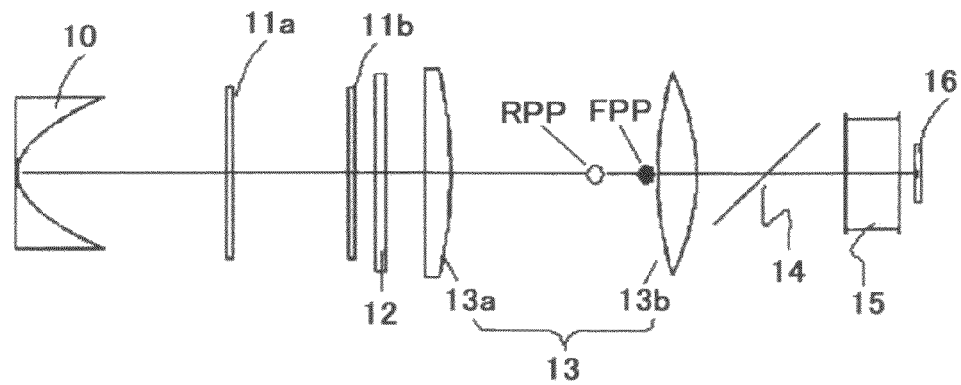

[Fig. 4]
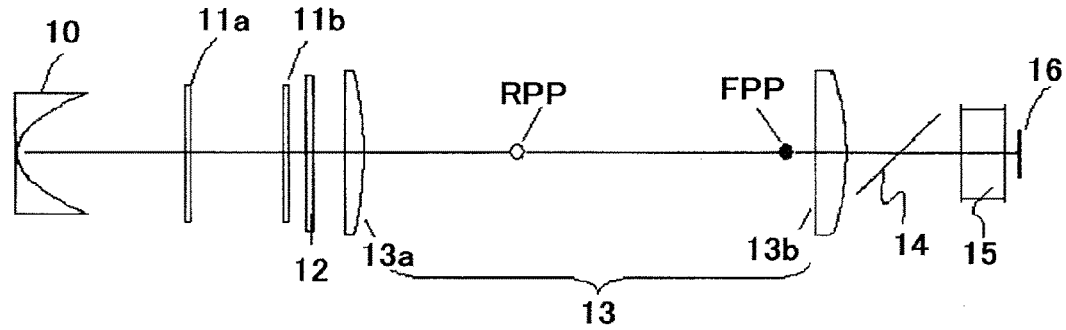
[Fig. 5]
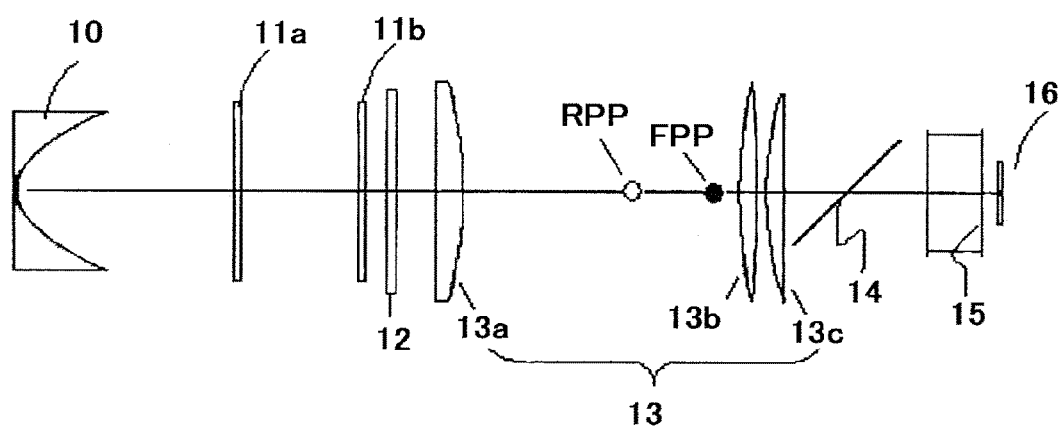
[Fig. 6]
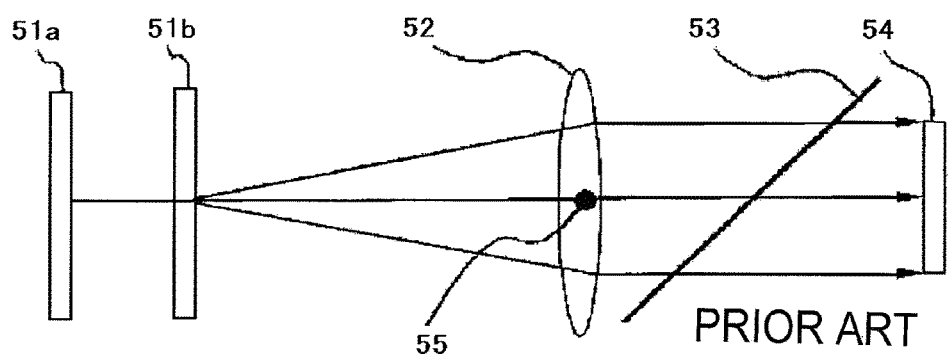
PRIOR ART

ILLUMINATION OPTICAL SYSTEM HAVING THE LONGEST AIR INTERSPACE DISTANCE BETWEEN A FIRST AND A SECOND OPTICAL UNIT WHERE A SPECIFIC CONDITION IS SATISFIED FOR THE OPTICAL SYSTEM

TECHNICAL FIELD

The present invention relates to an illumination optical system suitable for illuminating a spatial light modulating element such as a liquid crystal panel, and to an image projection apparatus with the same.

BACKGROUND ART

An image projection apparatus introduces light from a light source to a spatial light modulating element such as a liquid crystal panel or a micro-mirror array device through an illumination optical system, and then projects light image-modulated by the spatial light modulating element onto a projection surface such as a screen to display an image.

Japanese Patent Laid-Open No. 3-111806 discloses an illumination optical system for such an image projection apparatus. The illumination optical system includes an integration optical system which includes two lens arrays (first and second lens arrays). The integration optical system divides light from a light source into plural light fluxes by plural collective lenses constituting the first lens array, each collective lens having a rectangular aperture. The integration optical system overlaps the plural light fluxes with each other on an illumination surface (spatial light modulating element) by the second lens array formed of plural collective lenses corresponding to the plural rectangular apertures of the first lens array and a collective lens (condenser lens) disposed closer to the illumination surface than the second lens array. This integration optical system provides a homogeneous intensity distribution of the light illuminating the illumination surface.

Japanese Patent Laid-Open No. 2001-337393 discloses an illumination optical system suppressing horizontal color unevenness in a projected image, the color unevenness being generated due to a wavelength selective dichroic mirror. In this illumination optical system, a principal point of a collection optical system (plural collective lenses) which collects light from an integration optical system constituted by first and second lens arrays onto a spatial light modulating element is located at an intermediate position between the second lens array and the spatial light modulating element. This illumination optical system can improve a degree of parallelization of light entering the dichroic mirror as compared with conventional illumination optical systems, resulting in reduction in effect of an angular characteristic of the dichroic mirror to suppress the horizontal color unevenness in the projected image.

Japanese Patent Laid-Open No. 2004-45907 discloses an illumination optical system including an aperture stop which limits a spread angle of light entering a polarization beam splitter (hereinafter referred to as a "PBS"). The aperture stop increases an F-number of the illumination optical system, achieving a high contrast.

It is important for image projection apparatuses to have capability of increasing brightness and contrast of a projected image. However, it is difficult in reality to increase both the brightness and the contrast. The increase of the brightness needs increase of light utilization efficiency. The increase of the light utilization efficiency is realized by reducing the F-number of the illumination optical system. However, the reduction of the F-number reduces the contrast.

The contrast is reduced due to deterioration of reflection performance of the PBS which is used as a color separation/combination element, the deterioration being caused by increase of an incident angle of light entering the PBS. Reducing the F-number to increase the brightness increases the incident angle of the light entering the PBS, which deteriorates the reflection performance of the PBS. In other words, polarized light which should not be reflected by the PBS is reflected thereby, and polarized light which should be reflected thereby is transmitted therethrough without being reflected. As a result, in a state where a black image is projected, light (leakage light) which should be normally removed from projection light by reflection by the PBS is transmitted therethrough, and then is projected onto the black image, which reduces the contrast.

On the other hand, the spatial light modulating element has a similar angular characteristic thereto. That is, it has a characteristic which generates the leakage light projected onto the black image when an illumination optical system having a small F-number is used. Therefore, in order to project an image with a high contrast, it is necessary that an illumination light flux illuminating the spatial light modulating element be a collimated light flux (that is, a telecentric light flux with a large F-number).

Providing the aperture stop as disclosed in Japanese Patent Laid-Open No. 2004-45907 makes it possible to increase the F-number of the illumination optical system to obtain a high contrast. However, the limitation of the spread angle of light with the aperture stop blocks the light from the light source, which significantly reduces light utilization efficiency.

FIG. 6 shows an illumination optical system disclosed in Japanese Patent Laid-Open No. 2001-337393. The illumination optical system forms an illumination area with a homogeneous light amount distribution on a spatial light modulating element 54 by a first fly-eye lens 51a, a second fly-eye lens 51b and a condenser lens 52. When the spatial light modulating element 54 is disposed at a focal point position of the condenser lens 52 in this illumination optical system, the size of the illumination area is denoted with a magnification ratio B which is expressed by the following expression (7), the size of the illumination area corresponding to an enlarged size of each of lens cells constituting the first fly-eye lens 51a:

$$B = fc/ff2 \qquad (7)$$

where fc represents a focal length of the condenser lens 52, and ff2 represents a focal length of the second fly-eye lens 51b.

Thus, when the focal length ff2 of the second fly-eye lens 51b is fixed, increasing the focal length fc of the condenser lens 52 increases the magnification ratio B, which can increase the F-number of the illumination optical system.

However, in order to make the light flux entering the spatial light modulating element 54 from the condenser lens 52 telecentric, it is necessary to set the focal point position of the condenser lens 52 calculated from the spatial light modulating element side at the vicinity of a light collection point of the first fly-eye lens 51a.

Setting the light collection point of the first fly-eye lens 51a at the vicinity of the second fly-eye lens 51b makes it possible to increase utilization efficiency of the illumination light. In this case, the condenser lens 52 is disposed at an approximately intermediate position between the second fly-eye lens 51b and the spatial light modulating element 54. Reference numeral 55 denotes a principal point of the condenser lens 52.

When fc represents the focal length of the condenser lens 52, and Da represents an optical distance between the second fly-eye lens 51b and the spatial light modulating element 54, the following relationship is established:

$$Da \approx 2fc \qquad (8)$$

This means that the illumination optical system disclosed in Japanese Patent Laid-Open No. 2001-337393 has a very long entire length when the illumination optical system has a large F-number so as to achieve a high contrast.

DISCLOSURE OF INVENTION

The present invention provides a compact illumination optical system which brightly illuminates an illumination surface with light from a light source and enables high contrast image projection, and an image projection apparatus therewith.

The present invention provides as an aspect thereof an illumination optical system which includes an integrator configured to divide light from a light source into plural light fluxes, and a collection optical system configured to collect the plural light fluxes from the integrator toward an illumination surface. A rear principal point of the collection optical system is located closer to the light source than a front principal point of the collection optical system.

The present invention provides as another aspect thereof an image projection apparatus which includes a light modulating element, the above illumination optical system which illuminates the light modulating element with light from a light source, and a projection optical system configured to project the light from the light modulating element onto a projection surface.

The present invention provides as still another aspect thereof an image projection apparatus which includes plural light modulating elements, an illumination optical system configured to illuminate each light modulating element with light from a light source, a projection optical system configured to project the light from each light modulating element onto a projection surface, and a color separation/combination optical system configured to separate the light from the illumination optical system into plural color light components to introduce them to the plural light modulating elements, and to combine the plural color light components from the plural light modulating elements to introduce the combined color light components to the projection optical system. The illumination optical system includes an integrator configured to divide the light from the light source into plural light fluxes, and a collection optical system configured to collect the plural light fluxes from the integrator toward each light modulating element. A rear principal point of the collection optical system is located closer to the light source than a front principal point of the collection optical system.

Other aspects of the present invention will become apparent from the following description and the attached drawings.

BRIEF DESCRIPTION OF THE DRAWINGS

FIG. 1 is a schematic diagram of an image projection apparatus that is a first embodiment (Embodiment 1) of the present invention.

FIG. 2 is a diagram showing the configuration of an illumination optical system in Embodiment 1.

FIG. 3 is a diagram showing the configuration of an illumination optical system in a second embodiment (Embodiment 2) of the present invention.

FIG. 4 is a diagram showing the configuration of an illumination optical system in a third embodiment (Embodiment 3) of the present invention.

FIG. 5 is a diagram showing the configuration of an illumination optical system in a fourth embodiment (Embodiment 4) of the present invention.

FIG. 6 is a diagram showing the configuration of a conventional illumination optical system.

BEST MODE FOR CARRYING OUT THE INVENTION

Exemplary embodiments of the present invention will hereinafter be described with reference to the accompanying drawings.

Mode for the Invention 1

FIG. 1 shows the configuration of an image projection apparatus that is Embodiment 1 of the present invention. The image projection apparatus 2 includes a light source 10, an illumination optical system 3, three spatial light modulating elements 16a, 16b and 16c, and a projection optical system 4. This embodiment uses reflective liquid crystal panels (hereinafter referred to as "LCDs") as the spatial light modulating elements 16a, 16b and 16c. However, alternative embodiments of the present invention may use transmissive liquid crystal panels or micro-mirror array devices as the spatial light modulating elements.

The illumination optical system 3 includes a first fly-eye lens 11a, a second fly-eye lens 11b, a polarization conversion element 12, a first condenser lens 13a, and a second condenser lens 13b. The illumination optical system 3 further includes a dichroic mirror 14, and three polarization beam splitters (hereinafter referred to as "PBSs") 15a, 15b and 15c.

The first fly-eye lens 11a and the second fly-eye lens 11b constitute an integration optical system (integrator) which divides light from the light source 10 into plural light fluxes. The first condenser lens 13a and the second condenser lens 13b constitute a collection optical system (condenser) 13 which introduces the plural light fluxes from the integration optical system to each LCD (reflective liquid crystal panel) to illuminate the LCD with the plural light fluxes. In the collection optical system, the first condenser lens 13a corresponds to a first optical unit, and the second condenser lens 13b corresponds to a second optical unit which is disposed closer to an illumination surface (LCD) than the first optical unit. The first and second optical units are separated from each other with an air interspace longest in the collection optical system (condenser) 13. The first optical unit corresponds to an optical unit disposed on a light source side of the longest air interspace, and the second optical unit corresponds to an optical unit disposed on an illumination surface side of the longest air interspace.

The dichroic mirror 14 and the three PBSs 15a, 15b and 15c which are disposed closer to the LCD than the collection optical system 13 constitute a color separation optical system and a color combination optical system (hereinafter collectively referred to as a "color separation/combination optical system"). The collection optical system 13 can be said as an optical system which is constituted by plural lenses or diffractive optical elements having optical powers and is disposed between the integration optical system (or the polarization conversion element) and the color separation/combination optical system.

In this embodiment, an optical path of a light ray which emerges from the light source 10, passes through the centers of the first and second condenser lenses 13a and 13b, and then reaches the center of each LCD disposed at the illumination surface is referred to as an optical axis of the illumination optical system 3.

The first fly-eye lens 11a and the second fly-eye lens 11b (and the collection optical system 13) perform homogenization of an illuminance distribution (that is, conversion into a specific illuminance distribution) of an illumination light flux emerging from the light source 10 in parallel with the optical axis. The polarization conversion element 12 converts the illumination light flux into a light flux having a specific polarization direction. The light flux from the polarization conversion element 12 is collected by the first and second condenser lenses 13a and 13b to enter the dichroic mirror 14.

The dichroic mirror 14 separates white illumination light (illumination light flux) entering thereinto into one color light component (hereinafter referred to as a "first color light component") and two color light components (hereinafter referred to as a "second color light component" and a "third color light component") among a red light component, a green light component and a blue light component.

The PBS 15a reflects the first color light component transmitted through the dichroic mirror 14 to introduce it to the LCD 16a.

A drive circuit 31 is connected to the LCDs 16a, 16b and 16c, and an image signal from an image supply apparatus 32 such as a personal computer, a DVD player or a television tuner is input to the drive circuit 31. The drive circuit 31 drives the LCDs 16a, 16b and 16c on the basis of the input image signal. The image projection apparatus 2 and the image supply apparatus 32 constitute an image display system.

The LCD 16a image-modulates and reflects the first color light component. The reflected first color light component (modulated light) is transmitted through the PBS 15a and then enters the PBS 15c.

Of the second and third color light components reflected by the dichroic mirror 14, the second color light component is reflected by the PBS 15b and then introduced to the LCD 16b, and the third color light component is transmitted through the PBS 15b and then introduced to the LCD 16c. The LCDs 16b and 16c respectively image-modulate and reflect the second and third color light components. The reflected second color light component (modulated light) is transmitted through the PBS 15b and then enters the PBS 15c, and the reflected third color light component (modulated light) is reflected by the PBS 15b and then enters the PBS 15c.

The PBS 15c reflects the first color light component and transmits the second and third color light components to combine them and then introduces the combined color light components (combined light) to the projection optical system 4. The projection optical system 4 enlarges and projects the combined light onto a screen (projection surface), not shown.

Next, description will be made of optical actions of the illumination optical system in this embodiment with reference to FIG. 2. In FIG. 2, the three PBSs 15a to 15c are collectively shown as a PBS 15, and the three LCDs 16a to 16c are collectively shown as an LCD 16. Although FIG. 2 collectively shows the three PBSs as one PBS, an alternative embodiment of the present invention may use only one PBS.

The light source 10 is constituted by a discharge lamp and a parabolic reflector which reflects and collects light emitted from the discharge lamp. The discharge lamp is disposed at a focal point position of the parabolic reflector, so that a divergent light flux from the discharge lamp converts a light flux parallel to an axis of symmetry of a parabolic surface of the reflector (that is, the optical axis of the illumination optical system). Since the discharge lamp is not a point light source, but has a finite size, the light flux from the parabolic reflector includes some light components which are not parallel to the axis of symmetry of the parabolic surface.

This parallel (collimated) light flux enters the first fly-eye lens 11a. The first fly-eye lens 11a is constituted by combining plural lens cells which are arranged in matrix and each of which has a rectangular shape and a positive refractive power (optical power). The first fly-eye lens 11a divides the entering light flux into plural light fluxes by the plural lens cells and collects them.

The plural divided light fluxes pass through the second fly-eye lens 11b and then form plural light source images in matrix at the vicinity of the polarization conversion element 12.

The polarization conversion element 12 includes, though not shown, polarization beam splitting surfaces arranged in plural rows, reflective surfaces arranged in plural rows, and half-wave plates arranged in plural rows. Each of the divided light fluxes collected in matrix at the vicinity of the polarization conversion element 12 enters the polarization beam splitting surface corresponding to its row, and is separated into a P-polarized light component transmitted through the polarization beam splitting surface and an S-polarized light component reflected thereby.

The S-polarized light component reflected by the polarization beam splitting surface is reflected by the reflective surface, proceeds in a same direction as that of the P-polarized light component, and then emerges from the polarization conversion element 12.

The polarization direction of the P-polarized light component transmitted through the polarization beam splitting surface is rotated by 90 degrees by the half-wave plate to be converted into an S-polarized light component. The S-polarized light component then emerges from the polarization conversion element 12. Thus, the light flux (divided light fluxes) having the specific (same) polarization direction emerges from the polarization conversion element 12.

The divided light fluxes thus converted by the polarization conversion element 12 enter the collection optical system 13 as divergent light fluxes, and then are introduced from the collection optical system 13 to the dichroic mirror 14, the PBS 15 and the LCD 16.

In this embodiment, since the dichroic mirror 14 is disposed closer to the illumination surface (that is, to the LCD 16) than the second condenser lens 13b, the light flux (divided light fluxes) entering the dichroic mirror 14 is telecentric. Therefore, the dichroic mirror 14 in this embodiment does not need a wedge coat that is used for correcting variations of incident angular characteristics, which is different from conventional ones. Accordingly, a manufacturing cost of the dichroic mirror 14 can be reduced as compared with conventional dichroic mirrors.

Further, this illumination optical system 3 constitutes a collection optical system such that a rear principal point RPP of the collection optical system 13 is located closer to the light source 10 than a front principal point FPP thereof. Specifically, appropriately setting focal lengths (optical powers) of optical elements such as lenses which constitute the collection optical system, distances between the optical elements, and the like causes the rear principal point RPP of the collection optical system 13 to locate closer to the light source 10 than the front principal point FPP thereof. This configuration can reduce the length of the collection optical system (or miniaturize the illumination optical system) without increasing illuminance unevenness on the illumination surface, as compared with a case where the rear principal point RPP is located closer to the illumination surface than the front principal point FPP. The term "front" means a light source side, that is, a light-entering side, and the term "rear" means an LCD (illumination surface) side, that is, a light-emerging side.

Moreover, in the illumination optical system 3 in this embodiment, F1 represents a focal length of the first condenser lens 13a (focal length of the first optical unit) which is disposed closer to the light source 10 than the second condenser lens 13b, F2 represents a focal length of the second condenser lens 13b (focal length of the second optical unit), Fc represents a focal length of the collection optical system 13, and Bk represents an optical distance (optical path length) from an illumination surface side surface of the second condenser lens 13b to the LCD 16. The illumination surface side surface of the second condenser lens 13b is a rearmost (final) optical surface of the collection optical system 13, that is, a most-illumination surface side optical surface closest to the illumination surface in plural optical surfaces included in the illumination optical system 3.

In this case, it is preferable for the illumination optical system 3 to satisfy the following two conditions:

$$1.3 < Fc/(Fc-Bk) < 4 \quad (1)$$

$$1.3 < F1/F2 < 4 \quad (2)$$

If the values of Fc/(Fc−Bk) and F1/F2 are respectively lower than the lower limits of the conditions (1) and (2), the optical distance from the rearmost optical surface of the collection optical system 13 to the LCD 16 cannot be sufficiently ensured, which makes it necessary to dispose the dichroic mirror 14 between the first condenser lens 13a and the second condenser lens 13b. In this case, since the light flux entering the dichroic mirror 14 is not telecentric, color unevenness in a horizontal direction may be generated in a projected image.

On the other hand, if the values of Fc/(Fc−Bk) and F1/F2 are respectively larger than the upper limits of the conditions (1) and (2), increasing an F-number of the illumination optical system 3 to obtain a high contrast image may excessively increase the entire length of the illumination optical system 3, which increases the size of the image projection apparatus.

Accordingly, setting the values of Fc, F1, F2 and Bk so as to satisfy the conditions (1) and (2) can realize a compact illumination optical system enabling projection of a high contrast image and an image projection apparatus therewith.

However, even when the conditions (1) and (2) are not satisfied, causing the rear principal point RPP of the collection optical system 13 to locate closer to the light source than the front principal point FPP is effective for reducing the length of the collection optical system (or miniaturizing the illumination optical system).

Further, upon satisfaction of the conditions (1) and (2), it is preferable for the focal length Fc of the collection optical system 13 to satisfy the following condition (3):

$$3 < Fc/Dp < 15 \quad (3)$$

where Dp represents a diagonal length of a rectangular illumination area on the LCD 16.

If the value of Fc/Dp is lower than the lower limit of the condition (3), it is difficult to increase the F-number of the illumination optical system 3, which may reduce the contrast of the projected image. If the value of Fc/Dp is larger than the upper limit of the condition (3), the entire length of the illumination optical system 3 may be increased.

More preferably, the following condition (4) is satisfied:

$$2 < Fc/ff2 < 5.5 \quad (4)$$

where ff2 represents a focal length of the second fly-eye lens 11b.

If the value of Fc/ff2 is lower than the lower limit of the condition (4), it is difficult to increase the F-number of the illumination optical system 3, which may reduce the contrast of the projected image. If the value of Fc/ff2 is larger than the upper limit of the condition (4), the entire length of the illumination optical system 3 may be increased.

Still more preferably, the following condition (5) is satisfied:

$$2 < Bk/Dp \quad (5)$$

If the value of Bk/Dp is lower than the lower limit of the condition (5), a back focus (distance from the most-illumination surface side optical surface to the illumination surface) is reduced. The reduction of the back focus decreases the freedom degree of selecting optical elements disposed between the illumination optical system and the illumination surface, which makes it impossible to illuminate the entire illumination surface efficiently and homogeneously.

Still yet more preferably, the following condition (6) is satisfied:

$$0.8 < Fc/F2 < 0.98 \quad (6)$$

Satisfying this condition (6) can reduce an incident angle of the light flux on the illumination surface (or cause all light rays of the light flux to reach the illumination surface approximately perpendicularly thereto) without excessively increasing the size of the illumination optical system.

In particular, such an effect is significantly obtained in a case where a polarization beam splitter that has a polarization beam splitting surface tilting with respect to the optical axis of the illumination optical system is disposed between the illumination optical system and the illumination surface, which greatly improves illumination efficiency. This is also the same in a case where a dichroic mirror or a dichroic prism which has a color splitting surface (wavelength-dependent reflective film) tilting with respect to the optical axis of the illumination optical system is disposed between the illumination optical system and the illumination surface or a case where a wave plate (phase plate, color-selective phase plate) is disposed therebetween.

Moreover, it is preferable that an image projection apparatus including a liquid crystal panel and the above-described illumination optical system illuminating the liquid crystal panel satisfy the above-described condition (6). This makes it possible to increase the contrast without increasing the size of the image projection apparatus.

Thus, setting the values of Fc, F1, F2, Bk and ff2 so as to satisfy at least one of the conditions (3) to (6) in addition to the conditions (1) and (2) can more surely realize a compact illumination optical system enabling projection of a high contrast image and an image projection apparatus therewith.

Hereinafter, description will be made of a numerical example of Embodiment 1. The numerical example corresponds to a case where a screen (image modulating area) size of the spatial light modulating element is 0.7 inches (diagonal length Dp is 17.78 mm).

Numerical Example 1

Table 1 shows lens data of the first condenser lens (first optical unit) 13a and the second condenser lens (second optical unit) 13b of the illumination optical system 3 shown in FIG. 2.

TABLE 1

| SURFACE | r | d | n |
|---|---|---|---|
| 1 | ∞ | 8.76 | 1.516 |
| 2 | −150.3146 | 92 | |
| 3 | 72.364 | 13.21 | 1.516 |
| 4 | −340.7 | | |

Surfaces 1 and 2 are a light source side surface and an illumination surface side surface of the first condenser lens 13a, respectively. Surfaces 3 and 4 are a light source side surface and an illumination surface side surface of the second condenser lens 13b, respectively. These definitions are the same in other numerical examples described later.

The focal length ff2 of the second fly-eye lens 11b and the optical distance Bk from the rearmost optical surface of the second condenser lens 13b to the spatial light modulating element (LCD 16), that is, the illumination surface are:
ff2=38.73 mm
Bk=65.4 mm.

The focal length Fc of the entire collection optical system 13, the focal length F1 of the first condenser lens 13a and the focal length F2 of the second condenser lens 13b are:
Fc=108.2 mm
F1=291.12 mm
F2=116.87 mm.

Further, when FPPx and RPPx respectively represent distances in a direction of the optical axis from a first surface (Surfaces 1) of the collection optical system 13 to the front principal point FPP and the rear principal point RPP of the collection optical system 13, the distances FPPx and RPPx are:
FPPx=92.38 mm
RPPx=71.94 mm.

Thus, Numerical Example 1 (Embodiment 1) satisfies the conditions (1) to (6) as shown in Table 5.

Mode for the Invention 2

FIG. 3 shows the configuration of an illumination optical system that is a second embodiment (Embodiment 2) of the present invention. Constituent elements with the same reference numerals as those in FIG. 2 have similar functions to those of the corresponding constituent elements in Embodiment 1, and therefore descriptions thereof are omitted.

Numerical Example 2

Table 2 shows lens data of the first condenser lens (first optical unit) 13a and the second condenser lens (second optical unit) 13b of the illumination optical system shown in FIG. 3. This numerical example corresponds to the case where the screen size of the spatial light modulating element is 0.7 inches (diagonal length Dp is 17.78 mm).

TABLE 2

| SURFACE | r | d | n |
|---|---|---|---|
| 1 | ∞ | 8.76 | 1.516 |
| 2 | −176.40 | 70.79 | |
| 3 | 124.55 | 13.21 | 1.516 |
| 4 | −81.37 | | |

The focal length ff2 of the second fly-eye lens 11b and the optical distance Bk from the rearmost optical surface of the second condenser lens 13b to the spatial light modulating element (LCD 16), that is, the illumination surface are:
ff2=38.73 mm
Bk=65.4 mm.

The focal length Fc of the entire collection optical system 13, the focal length F1 of the first condenser lens 13a and the focal length F2 of the second condenser lens 13b are:
Fc=91.74 mm
F1=341.63 mm
F2=97.44 mm.

Further, the distances FPPx and RPPx in the optical axis direction from the first surface (Surfaces 1) of the collection optical system 13 to the front and rear principal points FPP and RPP of the collection optical system 13 are:
FPPx=77.49 mm
RPPx=68.79 mm.

Thus, Numerical Example 2 (Embodiment 2) satisfies the conditions (1) to (6) as shown in Table 5.

Mode for the Invention 3

FIG. 4 shows the configuration of an illumination optical system that is a third embodiment (Embodiment 3) of the present invention. Constituent elements with the same reference numerals as those in FIG. 2 have similar functions to those of the corresponding constituent elements in Embodiment 1, and therefore descriptions thereof are omitted.

Numerical Example 3

Table 3 shows lens data of the first condenser lens (first optical unit) 13a and the second condenser lens (second optical unit) 13b of the illumination optical system shown in FIG. 4. This numerical example corresponds to the case where the screen size of the spatial light modulating element is 0.7 inches (diagonal length Dp is 17.78 mm)

TABLE 3

| SURFACE | r | d | n |
|---|---|---|---|
| 1 | ∞ | 8.76 | 1.516 |
| 2 | −152.19 | 192 | |
| 3 | −4802.49 | 13.21 | 1.516 |
| 4 | −112.18 | | |

The focal length ff2 of the second fly-eye lens 11b and the optical distance Bk from the rearmost optical surface of the second condenser lens 13b to the spatial light modulating element (LCD 16), that is, the illumination surface are:
ff2=38.73 mm
Bk=65.4 mm.

The focal length Fc of the entire collection optical system 13, the focal length F1 of the first condenser lens 13a and the focal length F2 of the second condenser lens 13b are:
Fc=207.25 mm
F1=294.75 mm
F2=222.25 mm.

Further, the distances FPPx and RPPx in the optical axis direction from the first surface (Surfaces 1) of the collection optical system 13 to the front and rear principal points FPP and RPP of the collection optical system 13 are:
FPPx=193.13 mm
RPPx=72.91 mm.

Thus, Numerical Example 3 (Embodiment 3) satisfies the conditions (1) to (6) as shown in Table 5.

Mode for the Invention 4

FIG. 5 shows the configuration of an illumination optical system that is a fourth embodiment (Embodiment 4) of the present invention. Constituent elements with the same reference numerals as those in FIG. 2 have similar functions to those of the corresponding constituent elements in Embodiment 1, and therefore descriptions thereof are omitted. In this embodiment, the collection optical system 13 is constituted by a first condenser lens 13a serving as a first optical unit, and second and third condenser lenses 13b and 13c serving as a second optical unit. The third condenser lens 13c has a positive refractive power as well as the first and second condenser lenses 13a and 13b.

Numerical Example 4

Table 4 shows lens data of the first condenser lens 13a, the second condenser lens 13b and the third condenser lens 13c of the illumination optical system shown in FIG. 5. This numerical example corresponds to the case where the screen size of the spatial light modulating element is 0.7 inches (diagonal length Dp is 17.78 mm).

TABLE 4

| SURFACE | r | d | n |
|---|---|---|---|
| 1 | ∞ | 8.76 | 1.516 |
| 2 | −150.31 | 92 | |
| 3 | 172.36 | 6 | 1.516 |
| 4 | −340.70 | 3 | |
| 5 | 120.00 | 6 | 1.516 |
| 6 | ∞ | | |

Surfaces 5 and 6 are a light source side surface and an illumination surface side surface of the third condenser lens 13c, respectively.

The focal length ff2 of the second fly-eye lens 11b and the optical distance Bk from a rearmost optical surface of the third condenser lens 13c to the spatial light modulating element (LCD 16), that is, the illumination surface are:

ff2=38.73 mm
Bk=65.4 mm.

The focal length Fc of the entire collection optical system 13, the focal length F1 of the first condenser lens 13a and a combined focal length F2 of the second and third condenser lenses 13b and 13c are:

Fc=108.01 mm
F1=291.12 mm
F2=115.12 mm.

Further, the distances FPPx and RPPx in the optical axis direction from the first surface (Surfaces 1) of the collection optical system 13 to the front and rear principal points FPP and RPP of the collection optical system 13 are:

FPPx=96.02 mm
RPPx=73.20 mm.

Thus, Numerical Example 4 (Embodiment 4) satisfies the conditions (1) to (6) as shown in Table 5.

In Embodiments 1 to 3, the first optical unit of the collection optical system is constituted by the first condenser lens, and the second optical unit thereof is constituted by the second condenser lens. In Embodiment 4, the first optical unit is constituted by the first condenser lens, and the second optical unit is constituted by the second and third condenser lenses. The first and second optical units in the embodiments are separated from each other with an air interspace (that is, a distance between refractive surfaces) longest in the collection optical system 13. The first optical unit corresponds to an optical unit disposed on a light source side of the longest air interspace, and the second optical unit corresponds to an optical unit disposed on an LCD (illumination surface) side of the longest air interspace. The configuration of the collection optical system is not limited to those in Embodiments 1 to 4. For example, the first optical unit may be constituted by two lenses, and the second optical unit may be constituted by one lens. For example, the collection optical system may be constituted by four lenses or more. Further, the collection optical system may employ other configurations.

The values of the conditions (1) to (6) in the above four embodiments (numerical examples) are collectively shown in FIG. 5.

TABLE 5

| | EMBODIMENT 1 | EMBODIMENT 2 | EMBODIMENT 3 | EMBODIMENT 4 |
|---|---|---|---|---|
| CONDITION (1) | 2.528 | 3.48 | 1.46 | 2.53 |
| CONDITION (2) | 2.49 | 3.50 | 1.33 | 2.53 |
| CONDITION (3) | 6.08 | 5.16 | 11.66 | 6.07 |
| CONDITION (4) | 2.79 | 2.37 | 5.35 | 2.79 |
| CONDITION (5) | 3.678 | 3.678 | 3.678 | 3.678 |
| CONDITION (6) | 0.926 | 0.942 | 0.933 | 0.938 |

The satisfaction of at least one of the above conditions (1) to (6) provides the effects of the embodiments more significantly as compared with a case where the conditions (1) to (6) are not satisfied. However, it is not necessarily necessary for the embodiments to satisfy at least one of the conditions (1) to (6).

Further, it is more preferable to satisfy the following conditions (1a) to (6a) in place of the above conditions (1) to (6).

$$1.4 < Fc/(Fc-Bk) < 3.55 \tag{1a}$$

$$1.31 < F1/F2 < 3.65 \tag{2a}$$

$$5.0 < Fc/Dp < 12.0 \tag{3a}$$

$$2.2 < Fc/ff2 < 5.45 \tag{4a}$$

$$3 < Bk/Dp < 4.5 \tag{5a}$$

$$0.89 < Fc/F2 < 0.96 \tag{6a}$$

One of the upper and lower limits of the condition (1) may be replaced by that of the condition (1a). This is the same for the conditions (2) to (6) and the conditions (2a) to (6a).

The above-described embodiments use the reflective liquid crystal panels as the spatial light modulating elements. However, alternative embodiments of the present invention may use transmissive liquid crystal panels or digital micro-mirror devices (DMDs) as the spatial light modulating elements.

The above-described embodiments can reduce the size of the illumination optical system from the light source to the illumination optical system while obtaining a high brightness and a high contrast, thereby enabling projection of a bright image with a high contrast without excessively increasing (in other words, with decreasing) the size of the image projection apparatus including this illumination optical system.

Furthermore, the present invention is not limited to these embodiments and various variations and modifications may be made without departing from the scope of the present invention.

This application claims the benefit of Japanese Patent Application No. 2008-034266, filed on Feb. 15, 2008, which is hereby incorporated by reference herein in its entirety.

INDUSTRIAL APPLICABILITY

The present invention provides a compact illumination optical system which brightly illuminates an illumination surface with light from a light source and enables high contrast image projection, and an image projection apparatus therewith.

The invention claimed is:

1. An illumination optical system comprising:
an integrator configured to divide light from a light source into plural light fluxes; and
a collection optical system configured to collect the plural light fluxes from the integrator toward an illumination surface, the collection optical system comprising a first optical unit having a positive optical power and a second optical unit disposed closer to the illumination surface than the first optical unit and having a positive optical power,
the distance between the first optical unit and the second optical unit is the longest air interspace distance in the collection optical system,
wherein a rear principal point of the collection optical system is located closer to the light source than a front principal point of the collection optical system, and
wherein the following condition is satisfied:

$0.8 < Fc/F2 < 0.98$ where Fc represents a focal length of the collection optical system, and F2 represents a focal length of the second optical unit.

2. An illumination optical system according to claim 1, wherein the illumination optical system includes, between the collection optical system and the illumination surface, a polarization beam splitter which has a polarization beam splitting surface tilting with respect to an optical axis of the illumination optical system.

3. An illumination optical system according to claim 1 or 2, wherein the following conditions are satisfied:

$1.3 < Fc/(Fc - Bk) < 4$ $1.3 < F1/F2 < 4$ where F1 represents a focal length of the first optical unit, and Bk represents an optical distance from an optical surface closest to the illumination surface in plural optical surfaces included in the collection optical system to the illumination surface.

4. An illumination optical system according to claim 1, wherein the following condition is satisfied:

$3 < Fc/Dp < 15$ where Dp represents a diagonal length of a rectangular illumination area on the illumination surface.

5. An illumination optical system according to claim 1, wherein the following condition is satisfied:

$2 < Bk/Dp$ where Bk represents an optical distance from an optical surface closest to the illumination surface in plural optical surfaces included in the collection optical system to the illumination surface, and Dp represents a diagonal length of a rectangular illumination area on the illumination surface.

6. An image projection apparatus comprising:
a light modulating element;
an illumination optical system according to claim 1 which illuminates the light modulating element with light from a light source; and
a projection optical system configured to project the light from the light modulating element onto a projection surface.

7. An illumination optical system according to claim 3, wherein the following condition is satisfied:

$3 < Fc/Dp < 15$ where Dp represents a diagonal length of a rectangular illumination area on the illumination surface.

8. An illumination optical system according to claim 3, wherein the following condition is satisfied:

$2 < Bk/Dp$ where Bk represents an optical distance from an optical surface closest to the illumination surface in plural optical surfaces included in the collection optical system to the illumination surface, and Dp represents a diagonal length of a rectangular illumination area on the illumination surface.

9. An illumination optical system according to claim 4, wherein the following condition is satisfied:

$2 < Bk/Dp$ where Bk represents an optical distance from an optical surface closest to the illumination surface in plural optical surfaces included in the collection optical system to the illumination surface, and Dp represents a diagonal length of a rectangular illumination area on the illumination surface.

10. An image projection apparatus comprising: a light modulating element;
an illumination optical system according to claim 3 which illuminates the light modulating element with light from a light source; and
a projection optical system configured to project the light from the light modulating element onto a projection surface.

11. An image projection apparatus comprising: a light modulating element;
an illumination optical system according to claim 4 which illuminates the light modulating element with light from a light source; and
a projection optical system configured to project the light from the light modulating element onto a projection surface.

12. An image projection apparatus comprising: a light modulating element;
an illumination optical system according to claim 5 which illuminates the light modulating element with light from a light source; and
a projection optical system configured to project the light from the light modulating element onto a projection surface.

13. An illumination optical system according to claim 7, wherein the following condition is satisfied:

$$2 < Bk/Dp$$

where Bk represents an optical distance from an optical surface closest to the illumination surface in plural optical surfaces included in the collection optical system to the illumination surface, and Dp represents a diagonal length of a rectangular illumination area on the illumination surface.

14. An image projection apparatus comprising:
a light modulating element;
an illumination optical system according to claim 7 which illuminates the light modulating element with light from a light source; and
a projection optical system configured to project the light from the light modulating element onto a projection surface.

15. An image projection apparatus comprising:
a light modulating element;
an illumination optical system according to claim 8 which illuminates the light modulating element with light from a light source; and
a projection optical system configured to project the light from the light modulating element onto a projection surface.

16. An image projection apparatus comprising:
a light modulating element;
an illumination optical system according to claim 9 which illuminates the light modulating element with light from a light source; and
a projection optical system configured to project the light from the light modulating element onto a projection surface.

17. An image projection apparatus comprising:
a light modulating element;
an illumination optical system according to claim 13 which illuminates the light modulating element with light from a light source; and
a projection optical system configured to project the light from the light modulating element onto a projection surface.

* * * * *